US008306166B1

United States Patent
Fox (10) Patent No.: US 8,306,166 B1
(45) Date of Patent: Nov. 6, 2012

(54) SYSTEM AND METHOD FOR DETECTING BURST NOISE DURING QUADRATURE AMPLITUDE MODULATION COMMUNICATIONS

(75) Inventor: David Fox, Bolton, MA (US)

(73) Assignee: Casa Systems, Inc., Andover, MA (US)

( * ) Notice: Subject to any disclaimer, the term of this patent is extended or adjusted under 35 U.S.C. 154(b) by 0 days.

(21) Appl. No.: 13/351,699

(22) Filed: Jan. 17, 2012

(51) Int. Cl.
*H03D 1/06* (2006.01)

(52) U.S. Cl. ........ 375/346; 375/222; 375/257; 375/261; 455/63.1; 455/67.13; 455/226.1; 455/304; 455/305; 714/762; 714/788

(58) Field of Classification Search .................. 375/219, 375/220, 222, 257, 261, 284, 285, 340, 346; 455/63.1, 67.11, 67.13, 226.1–226.2, 296, 455/302–305; 329/304, 306, 308; 714/746, 714/762, 788
See application file for complete search history.

(56) References Cited

U.S. PATENT DOCUMENTS

| | | | |
|---|---|---|---|
| 6,611,795 B2 * | 8/2003 | Cooper .................. | 702/191 |
| 7,418,026 B2 * | 8/2008 | Asjadi ................... | 375/136 |
| 7,751,514 B2 * | 7/2010 | Tsuie et al. ............. | 375/350 |
| 2008/0123788 A1 * | 5/2008 | Wongwirawat et al. ...... | 375/348 |

* cited by examiner

*Primary Examiner* — Dac Ha
(74) *Attorney, Agent, or Firm* — McCarter & English, LLP (57) ABSTRACT

A system and method for detecting burst noise during quadrature amplitude modulation (QAM) communications are provided. A QAM signal is acquired at a receiver in communication with a network. The QAM signal is demodulated at the receiver to identify a plurality of symbols. Amplitudes for each of the plurality of symbols are determined, and are compared to a predetermined threshold. For each amplitude that is greater than the predetermined threshold, information is recorded at the receiver relating to a burst noise event. The magnitude of the burst noise can be determined by measuring a difference between a received constellation point and a perimeter constellation point closest to the received constellation point. The information about the burst noise event can be transmitted to an error correction module for reducing future burst noise in the network. Equalizer coefficients and tracking loop performance can be adjusted/enhanced using the burst noise information.

27 Claims, 9 Drawing Sheets

SYSTEM AND METHOD FOR DETECTING BURST NOISE DURING QUADRATURE AMPLITUDE MODULATION COMMUNICATIONS

BACKGROUND OF THE INVENTION

1. Field of the Invention

The present invention relates to noise detection in communications systems. More specifically, the present invention relates to a system and method for detecting burst noise during quadrature amplitude modulation communications.

2. Related Art

Quadrature Amplitude Modulation (QAM) is a known modulation technique for transmitting digital information. In QAM, both the phases and the amplitudes of two sinusoidal signals are modulated to define points or "symbols" in a constellation, each of which conveys digital information. Various "orders" of QAM can be utilized to transmit digital information at different bit rates, such as 16-QAM, 64-QAM, 256-QAM, etc.

Figure 1:
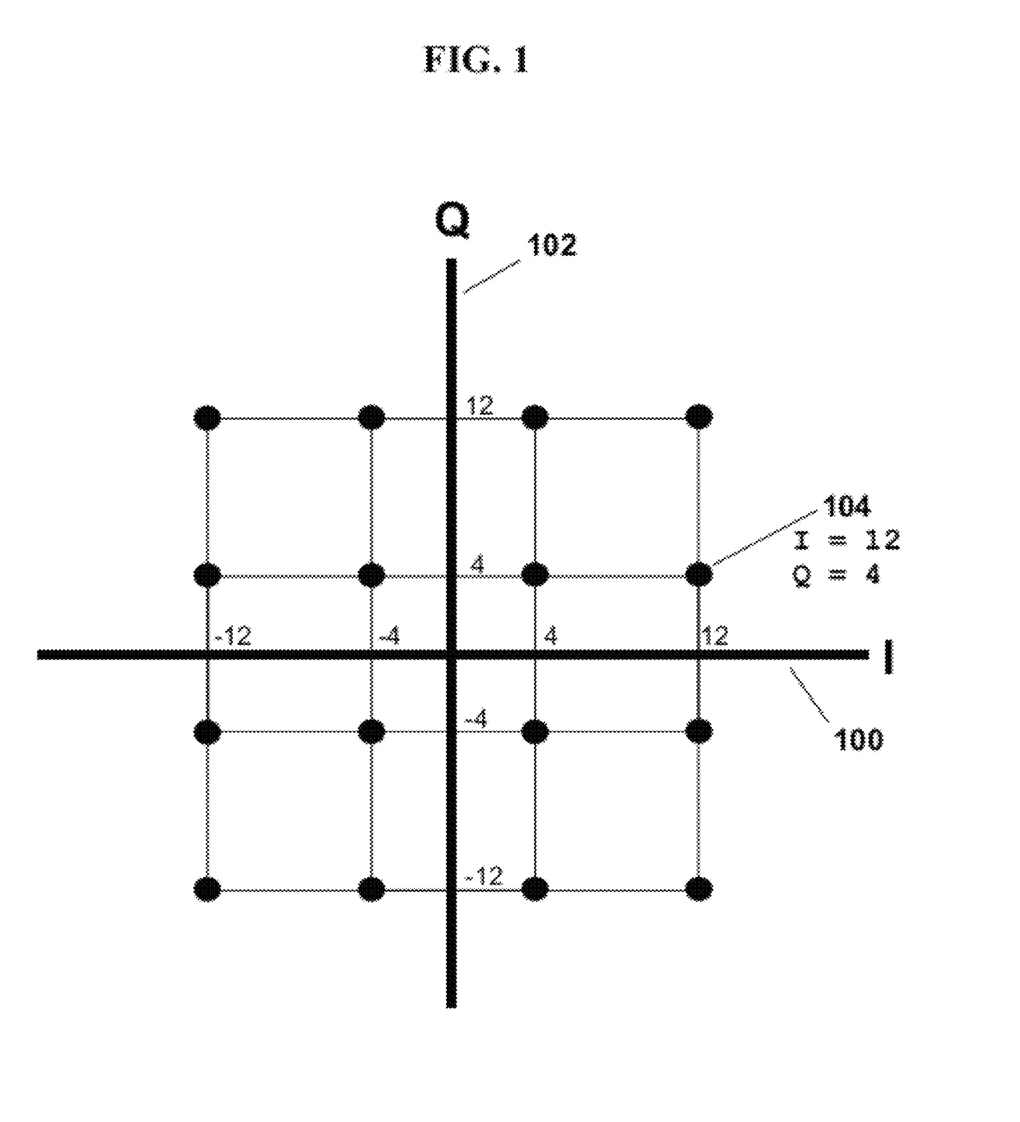
FIG. 1 is a diagram illustrating a 16-QAM constellation.

FIG. 1 shows an example of a 16-QAM constellation. The 16-QAM constellation has 16 possible points that can be distinguished where each point represents a 4-bit value. The constellation is represented by an X-Y axis, where the X-axis is referred to as the in-phase (I) axis 100, and the Y-axis is referred to as the quadrature (Q) phase axis 102. During QAM modulation, a sine wave and a cosine wave are transmitted together. By definition, the phases of these two signals are shifted by 90 degrees. The magnitude of the in-phase component is represented by the magnitude of the cosine wave at its peaks, which occurs at 0 and 180 degrees. The magnitude of the quadrature phase component is represented by the magnitude of the sine wave at its peaks, which occurs at 90 and 270 degrees. At the peaks of the cosine wave, the sine wave is zero, and vice-versa. The sine and cosine waves are therefore said to be orthogonal since they do not interfere with each other. Therefore, these two waves may be mixed together. By taking two measurements 90 degrees apart, the magnitude of the in-phase and quadrature phase components may be obtained. For example, constellation point 104 in FIG. 1 has an in-phase magnitude (I)=12, and a quadrature phase magnitude (Q)=4. These two values uniquely define a single constellation point.

QAM is currently used in a number of different communications devices, including cable modems. Cable modems (CMs) can be found in both homes and businesses, and are used to transmit and receive digital information (e.g., to access the Internet, view television and/or on-demand video, etc.). Numerous CMs can communicate with a device known as a Cable Modem Termination System (CMTS), which is installed at a central location and used to transmit information to CMs, as well as receive information from CMs. The signal between these devices traverses a communications network that includes both coaxial cable and fiber optic cable, and is known as a Hybrid Fiber-Coax (HFC) network or cable "plant." The protocol used to communicate between the CMTS and CMs has been standardized by the CableLabs organization and is collectively known as DOCSIS (Data Over Cable Service Interface Specifications). The set of DOCSIS specifications define all levels of communication including the physical layer, media access control layer, and an application interface layer.

Many CMs share the bandwidth of the same coaxial cable. The coaxial cable has a bandwidth of approximately 1 GHz, which is divided into multiple channels. The spectrum consumed by a given channel is defined by its center frequency and width. Each defined channel is typically shared by many CMs. In the downstream direction, from the CMTS to the CM, the CMTS uses time division multiplexing to send data to all CMs using a unique address to send data to a particular CM. In the upstream direction, from the CM to the CMTS, many CMs must share the same channel. To accomplish this, the CMTS schedules time slots for each CM in a control structure known as a MAP. A given CM is only allowed to send data during its time slot. Synchronization signals from the CMTS to the CM keep the different CMs synchronized. Within a channel, Quadrature Amplitude Modulation (QAM) is used to represent the data on the coaxial cable.

The HFC plant, especially the coaxial portion, is subject to many different types of impairments that degrade the quality of the signal. These impairments are typically caused by problems such as loose or corroded connections, unterminated lines, faulty equipment, and other noise caused by sources such as motors and lightning. Some types of noise such as Additive White Gaussian Noise (AWGN) are present all of the time. Another type of noise, known as burst or impulse noise, persists for a relatively short period of time. These noise sources can cause the decoded constellation point to move from its ideal position, thereby corrupting the transmission of data. The direction of movement and the amount of movement depend upon the phase of the noise source relative to the signal and the magnitude of the noise.

DOCSIS defines multiple mechanisms for dealing with different kinds of noise. For example, Reed Solomon (R-S) Forward Error Correction (FEC) is a redundancy code used for recovering multiple bytes of corrupted data. R-S FEC is useful for combating both AWGN noise and burst noise. Interleaving is another mechanism that interleaves different R-S FEC codewords such that a burst of noise impacts a small portion of many codewords instead of a larger portion of one codeword. This technique is also useful for combating burst noise. Both R-S FEC and interleaving have various defined parameters that can be adjusted for custom tuning to the conditions of the particular HFC plant. Therefore, measuring the characteristics of the noise in the HFC plant is an important tool for determining the proper corrective action for operators of such systems.

SUMMARY OF THE INVENTION

The present invention relates to a system and method for detecting burst noise during quadrature amplitude modulation (QAM) communications. The system includes a receiver for receiving a QAM signal from a network, the receiver demodulating the QAM signal to identify a plurality of symbols, and a burst noise detection module in the receiver for detecting burst noise in QAM signals received by the receiver, wherein the burst noise detection module determines amplitudes for each of the plurality of symbols, compares the amplitudes to a predetermined threshold, and records information relating to a burst noise event for each absolute amplitude that is greater than the predetermined threshold. Burst noise events can be detected by detecting energy which lies outside of boundaries of a QAM constellation, with the boundaries of the QAM constellation defined by the symbols which lie on the perimeter of the constellation. The magnitude of the burst noise can be determined by measuring a difference between a received constellation point and a perimeter constellation point closest to the received constellation point. The information about the burst noise event can be transmitted to an error correction module for reducing future burst noise in the network. Equalizer coefficients and tracking loop performance can be adjusted/enhanced using the burst noise information.

In another embodiment, the present invention provides a method that includes the steps of: acquiring a QAM signal at a device in communication with a cable modem system; demodulating the QAM signal at the receiver to identify a plurality of symbols; determining normalized amplitudes for each of the plurality of symbols using a burst noise detection module; comparing the amplitudes to a threshold using the burst noise detection module; and for each absolute amplitude that is greater than the threshold, recording information relating to a burst noise event.

In another embodiment, the present invention relates to a non-transitory, computer-readable medium having computer readable instructions stored thereon which, when executed by a receiver in communication with a network, cause the receiver to perform the steps comprising: acquiring a QAM signal; demodulating the QAM signal at the receiver to identify a plurality of symbols; determining at the receiver amplitudes for each of the plurality of symbols; comparing at the receiver the amplitudes to a predetermined threshold; and for each absolute amplitude that is greater than the predetermined threshold, recording at the receiver information relating to a burst noise event.

In another embodiment, the present invention provides a receiver circuit for detecting burst noise during quadrature amplitude modulation (QAM) communications in a cable modem system, comprising: radio frequency (RF) front-end circuitry for receiving a QAM signal and demodulating the QAM signal to identify a plurality of symbols; and burst noise detection circuitry in communication with the RF front-end circuitry, the burst noise detection circuitry determining normalized amplitudes for each of the plurality of symbols, comparing the amplitudes to a threshold, and recording information relating to a burst noise event for each absolute amplitude that is greater than the predetermined threshold.

BRIEF DESCRIPTION OF THE DRAWINGS

The foregoing features of the invention will be apparent from the following Detailed Description of the Invention, taken in connection with the accompanying drawings, in which.

DETAILED DESCRIPTION OF THE INVENTION

The present invention relates to a system and method for detecting burst noise in quadrature amplitude modulation (QAM) communications, as discussed in detail below in connection with FIGS. 2-9. As used herein, the terms "points" and "symbols" are used interchangeably. Also, as disclosed herein; detection of a burst noise "occurrence" refers to the detection of a single constellation point (symbol) located in the burst noise detection region discussed below. Further, a burst noise "event" refers to a continuous elevated level of burst noise that lasts for a relatively short period of time. Therefore, multiple burst noise occurrences may be detected within a single burst noise event.

Figure 2:
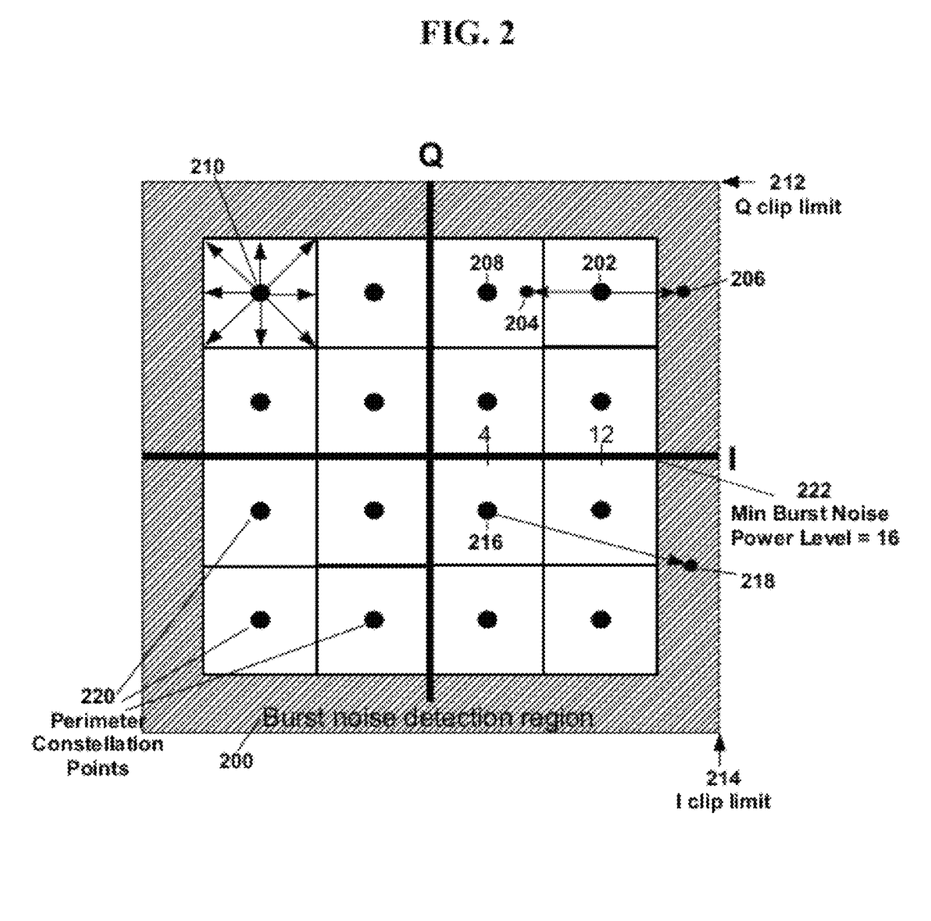
FIGS. 2-5 are diagrams illustrating the method of the present invention for detecting burst noise during QAM communications.

FIG. 2 is a diagram illustrating a method according to the present invention for detecting burst noise in QAM communications. Shown in FIG. 2 is a sample 16-QAM constellation that includes 16 symbols or "points." The method of the present invention can be implemented in connection with QAM communications of various orders, such as 16-QAM, 64-QAM, 256-QAM, etc. Constellation point 210 is shown in its ideal location. Unwanted noise can cause constellation point 210 to move in any direction relative to the ideal constellation point. The present invention defines a burst noise detection region 200 about the periphery of the constellation. Statistically, as will be shown hereinbelow, some constellation points corrupted by burst noise will be deflected into the burst noise detection region, and other corrupted constellation points will go undetected, deflected somewhere else inside of the constellation.

Additive White Gaussian Noise (AWGN) is the predominant noise source in HFC plants. Any burst noise detection scheme must be able to distinguish the burst noise from AWGN. Cable operators will typically select the parameters of a given channel based upon the magnitude of the AWGN. Referring to FIG. 2, if the AWGN corrupts a given constellation point, such as point 210, but the constellation point still remains within the box surrounding the constellation point, then the constellation point will be decoded correctly. Therefore, parameters such as the QAM constellation order, which determines the density of the constellation, and hence the proximity of constellation points to one another, are chosen such that the level of AWGN will rarely cause the constellation point to wander outside of its box, thereby resulting in a decode error. Any burst noise of interest will result in an error which is greater than the maximum error caused by AWGN.

As shown in FIG. 2, depending upon the phase of the burst noise relative to the desired signal, the constellation point can be moved in any direction. Thus, for example, the constellation point 210 could move in any direction based upon the phase of the burst noise. Referring back to the constellation point 202, if the burst noise causes the constellation point 202 to move to location 204, the symbol will be incorrectly decoded as corresponding to another constellation point, i.e., constellation point 208. If the burst noise causes the constellation point to move to location 206, then the received constellation point may be tagged as being located outside of the constellation.

As shown, not all burst noise will result in a received constellation point being moved outside of the constellation. When the burst noise relocates the constellation point to another location inside the constellation, it is impossible to determine if the error was due to AWGN or burst noise. Therefore, the ability to measure burst noise by detecting constellation points located outside of the constellation is based on probability. This probability, in turn, is dependent upon the intended location of the received constellation point, the phase of the burst noise relative to the desired signal, and the amplitude of the burst noise. Constellation points located on the perimeter of the constellation, such as perimeter constellation points 220, are more likely to be deflected outside of the constellation due to their proximity to the perimeter. However, since burst noise can often be as powerful as the desired received signal, even an internal constellation point such as constellation point 216 can be pushed outside of the constellation, e.g., to location 218.

As shown in FIG. 2, received constellation points which are located in the burst noise detection region 200 are flagged as burst noise occurrences. The burst noise detection region 200 is located outside the perimeter of the constellation, and is defined, in part, by the perimeter constellation points 220. A pre-defined minimum burst noise power level on a given axis, e.g., in-phase (I) axis 222, defines the inner boundary of the burst noise detection region. This value is the boundary between the AWGN detection region (i.e., the box surrounding a given constellation point) and the burst noise detection region 200. Using the scale defined in FIG. 2, this value is 16, but other values could be used. For example, a value slightly larger than this could be used as the start of the burst noise detection region 200 to avoid false triggering on AWGN events which occasionally cross slightly over the boundary, resulting in correctable and uncorrectable errors. The upper boundary of the burst noise detection region 200 depends upon the dynamic range of the receiver. The receiver is designed to clip at pre-defined defined maximum values, i.e., quadrature (Q) clip limit 212 and in-phase (I) clip limit 214. The clip limits 212, 214 therefore define the outer boundary of the burst noise detection region 200.

It should be noted that the example shown in FIG. 2 assumes that the actual AWGN level of the HFC plant results in errors which are close to the boundary of the boxes surrounding the constellation points shown in FIG. 2. This should be the typical case if the QAM modulation order is chosen properly. However, some operators may run with lower QAM modulation orders such that the AWGN errors are not powerful enough to cross, or even approach, the boundaries between constellation points. Therefore, instead of defining the lower level of the burst noise detection region 200 based upon the QAM modulation order, it is more accurate and effective in these cases to base the lower limit on the actual measured error. The measured error is typically maintained in the form of the Modulation-Error-Ratio (MER) in the CMTS.

Since burst noise typically lasts for several symbols or more, there is a good probability that the burst noise will cause at least one of the symbols to be relocated outside of the constellation. Also, since burst noise events occur fairly often, even if one burst noise event does not result in the relocation of symbols outside the constellation, other events may. By gathering statistics over a relatively long period of time (e.g., several seconds), a very good profile of the burst noise characteristics can be generated. There are a few different characteristics of burst noise which are useful to monitor. These include the duration of the event, the amplitude of the event, the spectrum where the burst noise was detected, and how often the burst noise events occur.

Figure 3:
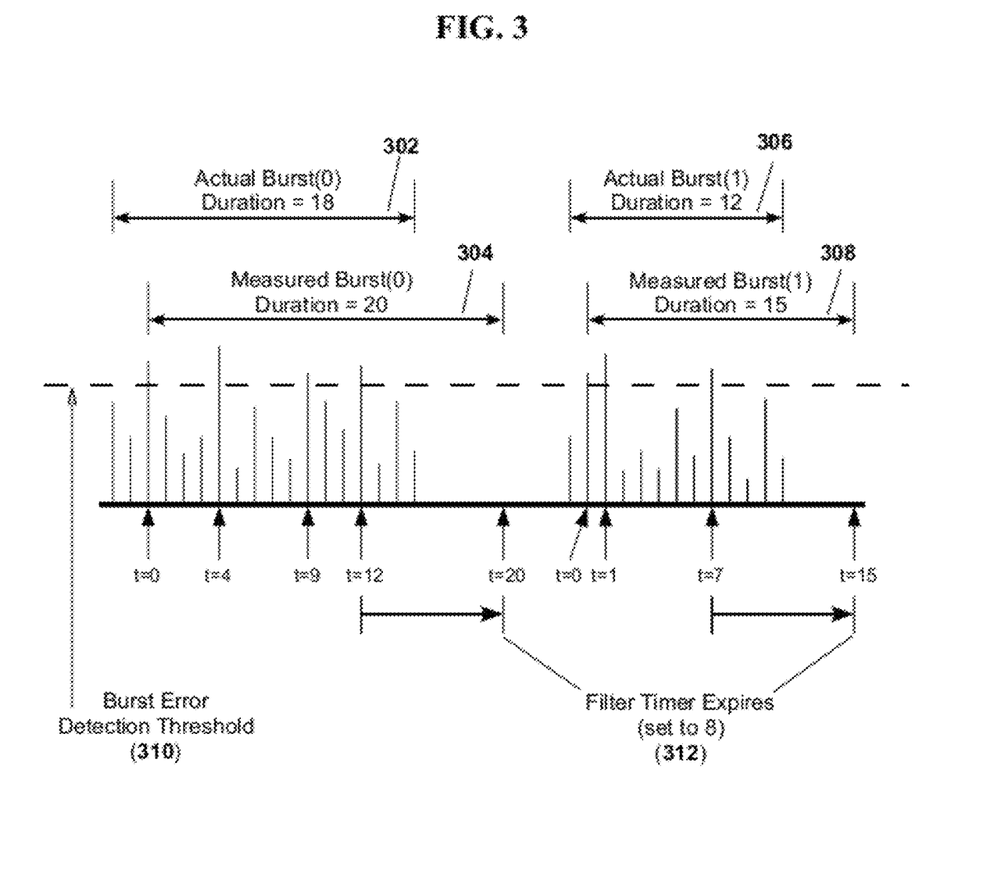

FIG. 3 is a diagram illustrating measurement of durations of two sequential burst events, according to the present invention. The sequential vertical lines in FIG. 3 represent sequential symbols. The height of each line represents the proximity of an errored symbol to the burst noise error detection threshold 310. If the vertical line crosses the threshold, then a burst noise occurrence is flagged. Since not all received symbols cross the detection threshold 310, a low pass filter is needed in the detection algorithm to allow for the lower rate of occurrence. This can be accomplished by starting a timer whenever a burst noise occurrence is detected. As indicated at 312, if the timer expires prior to detection of the next burst noise event, then the next event is considered to be a separate event. The filter timer could be set to a value which is roughly two times the average distance between detected burst noise occurrences. In the example shown in FIG. 3, the filter timer is set to a value of 8. The duration of the burst noise event is measured from the detection of the first burst noise occurrence to the expiration of the timer following the last detected burst noise occurrence. The filter timer will statistically compensate for the fact that the first and/or last burst noise error will not always be detected. For burst event Burst(0) in FIG. 3, the measured burst duration 304 is 20 symbols while the actual burst duration 302 is 18 symbols, a difference of 2 symbols. If the duration did not include the expiration of the timer, then the measured duration would be 12, resulting in a larger error of 4 symbols. A second burst event, Burst(1), is also shown in FIG. 3, including the actual burst duration 306 and the measured burst duration 308. The spacing between Burst(0) and Burst(1) is sufficient such that they are detected as separate burst events.

Figure 4:
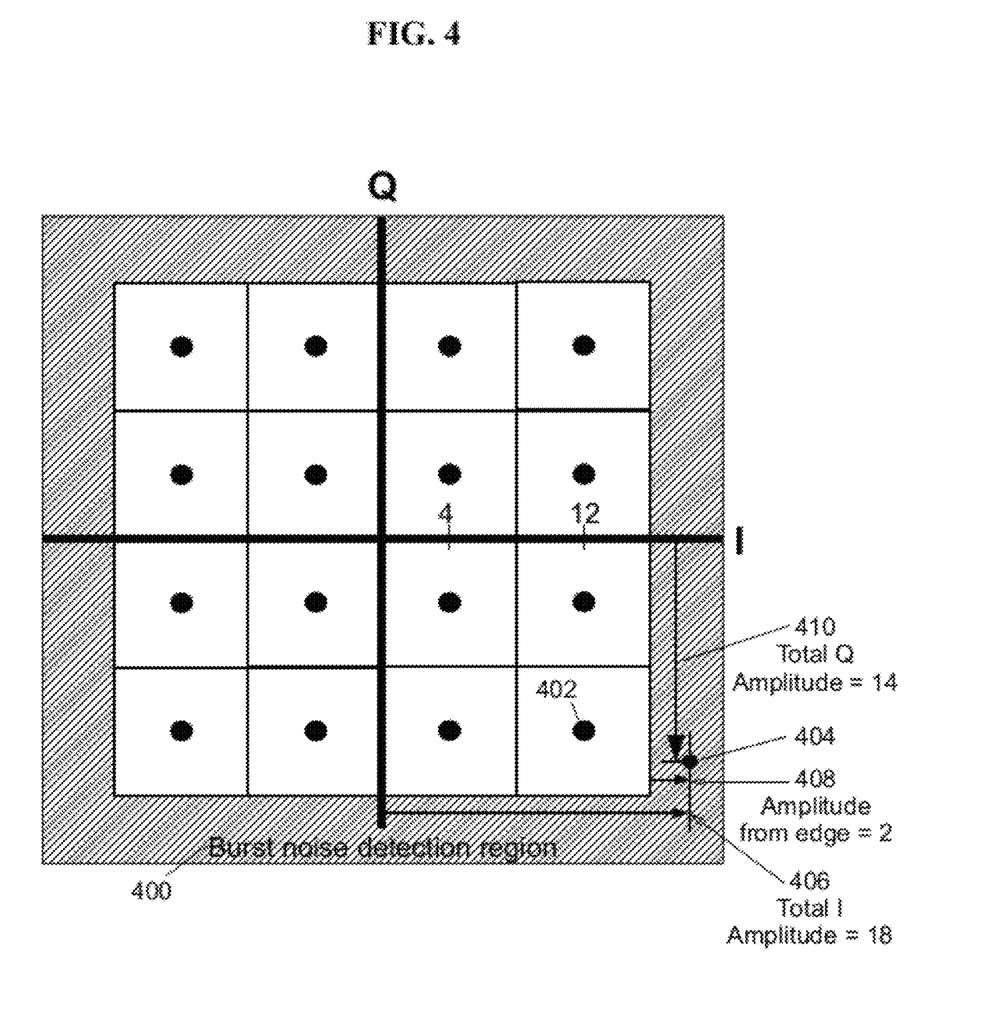
Figure 5:
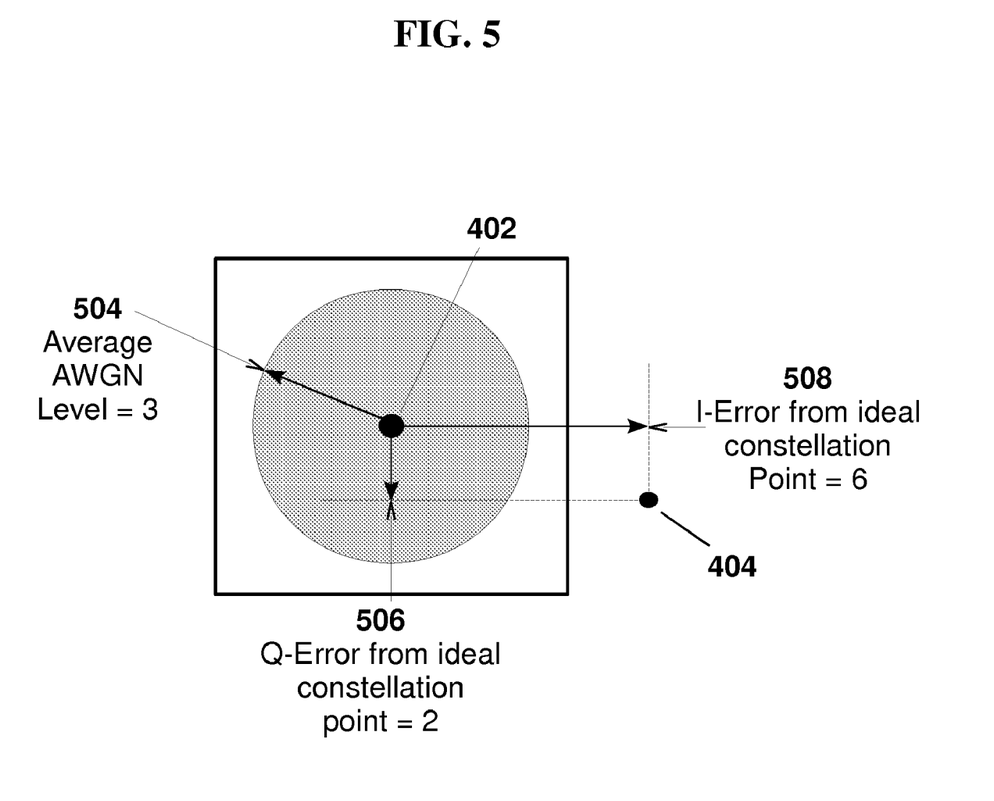

FIGS. 4-5 are diagrams illustrating the effects of AWGN and handling of same by the present invention. The burst noise is added on top of both the desired signal as well as any AWGN and other potential impairments. However, a best-guess estimate of the burst noise amplitude can be made. In FIGS. 4-5, point 404 represents a demodulated constellation point which has been corrupted by burst noise. Since this point is closest to the ideal constellation point 402, it is assumed that this was the intended constellation point. Using point 402 as the assumed desired symbol, the desired signal can be subtracted out. On the I-axis, the total absolute amplitude 406 is 18. The absolute I value for the ideal constellation point 402 is 12. Therefore, the magnitude of the error is now (18−12)=6, as shown by reference numeral 508 in the FIG. 5. On the Q-axis, the total absolute amplitude 410 is 14. The Q value for the ideal constellation point 402 is 12. Therefore, the magnitude of the Q error is now (14−12)=2, shown by reference numeral 506 in FIG. 5.

Since the desired signal has been removed as discussed above, it is now necessary to remove the contribution from AWGN. The actual AWGN level isn't known, but during the data burst the average error is measured in order to determine the Modulation Error Ratio (MER). In FIG. 5, the average error is shown at reference numeral 504. For the purposes of this discussion, the average error is set to 3. By subtracting the average error from the I-error, the AWGN contribution is removed in order to arrive at the I-error amplitude of (6−3)=3. The value of 3 is therefore the measured magnitude of the burst noise contribution. This is an estimate since the actual amplitude and phase relationship between the burst noise, the desired signal, the AWGN, and other associated noise is not known. While the resultant value may only be an estimate, the relative value of this amplitude measurement versus other amplitude measurements should be fairly accurate, and can be very helpful with debugging noise problems in the HFC network. Also, by averaging a large number of measurements, the estimated value should converge towards the actual value. Since the burst noise detection is implemented in the symbol slicer, after the downconversion of channels to baseband, the burst noise can be associated with the spectrum occupied by a given channel. Therefore, the characteristics of burst noise within an HFC plant as they relate to the upstream spectrum of the plant can be determined with a resolution equal to the channel width of the defined channels.

Figure 6:
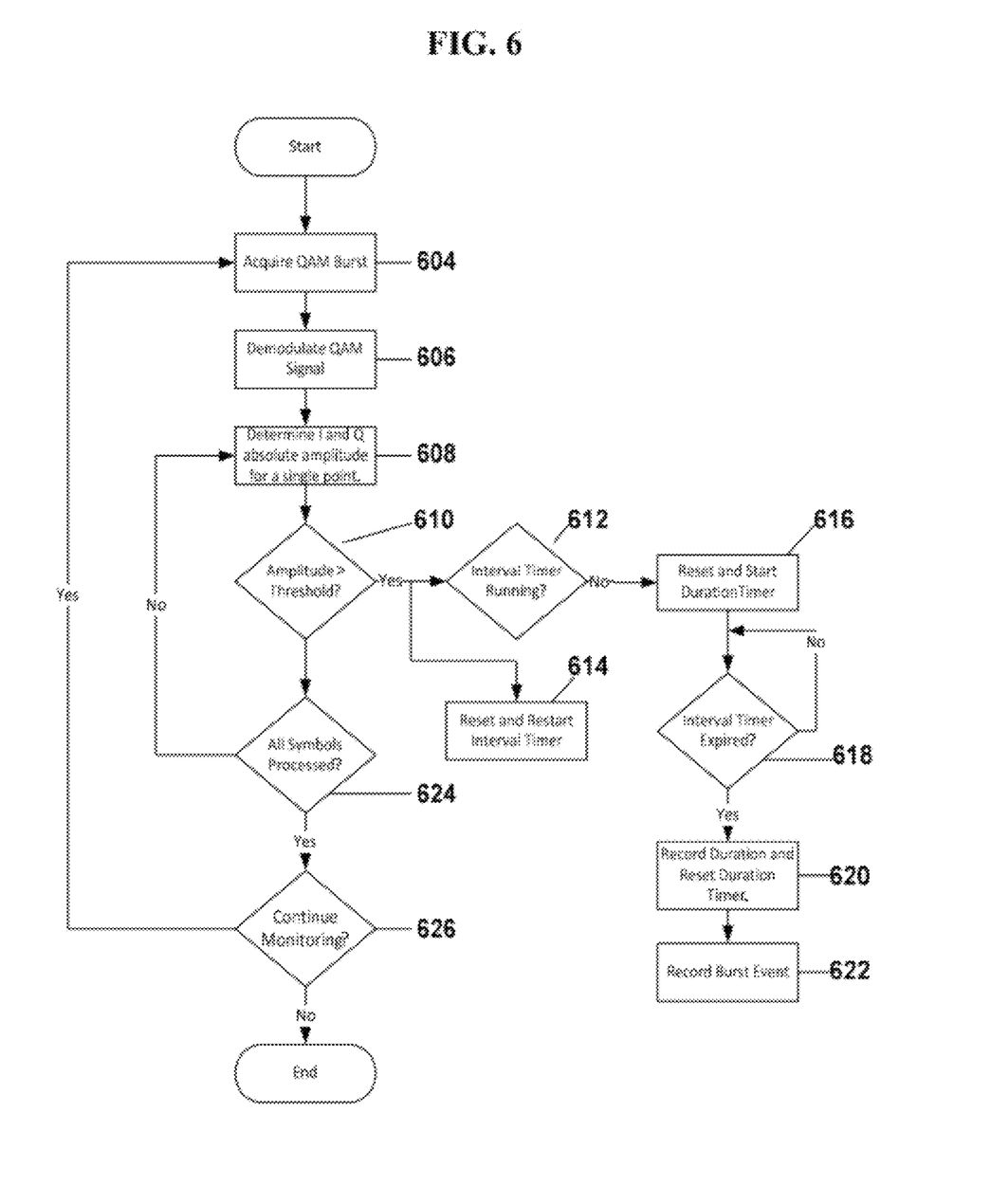
FIG. 6 is a flowchart showing processing steps according to the present invention for detecting burst noise.

FIG. 6 is a flowchart showing processing steps according to the present invention for detecting burst noise in QAM communications. Beginning in step 604, a QAM burst is acquired. Then, in step 606, the QAM burst is demodulated such that the magnitudes of the in-phase (I) and quadrature-phase (Q) components of the signal can be extracted. In step 608, the I and Q absolute amplitudes are determined for a single point. In step 610, a determination is made as to whether either of the amplitudes (or, both) is greater than a pre-defined threshold. The pre-defined threshold corresponds to the burst error detection threshold 310 shown in FIG. 3, which could be defined/modified by an operator of a cable system at the CMTS. If a positive determination is made, burst noise processing, as described in steps 612-622, occurs. Also, in parallel with the burst noise processing, decoding of the received symbols continues in steps 624 and 626. Specifically, in step 624, a determination is made as to whether all symbols have been processed. If a negative determination is made, control returns back to step 608 so that additional symbols can be processed. Otherwise, if a positive determination is made, step 626 occurs, wherein a determination is made as to whether to continue to monitor for bursts. If so, control returns back to step 604, so that another QAM burst can be acquired and processed in accordance with the present invention. Otherwise, processing ends.

If a positive determination of burst noise is made in step 610 (i.e., if the I and/or Q absolute amplitudes are greater than the pre-defined threshold), steps 612 and 614 occur. In step 614, an interval timer, which measures the distance between separate burst occurrences, is reset and restarted. If the interval timer is not running at the time that it is restarted, then the implication is that there were no prior burst occurrences which were part of the same burst event. Therefore, if in step 612 it is determined that the timer wasn't running, a new burst event is indicated, and the burst event duration timer is reset and restarted in step 616. In step 618 the interval timer is continually monitored. The expiration of the interval timer signifies the end of the burst event, and the duration of the burst event is recorded in step 620 before the duration timer is reset in preparation for the next burst event. Finally, in step 622, all of the pertinent information about the burst event, such as its magnitude and duration, is recorded for subsequent inclusion in the overall burst noise statistics for the channel.

It is noted that the frequency of occurrence of burst events having different widths can be determined by the present invention, using the processing steps disclosed herein. Moreover, an operator of the receiver can program the predetermined threshold to which the amplitudes of the symbols (I and/or Q amplitudes) are compared. Moreover, the receiver can be programmed to dynamically determine the predetermined threshold based upon measured AWGN levels. Further, the present invention can be used to detect burst noise information for each channel in the network, and the burst noise information can have a spectral resolution corresponding to the width of the channel.

Figure 7:
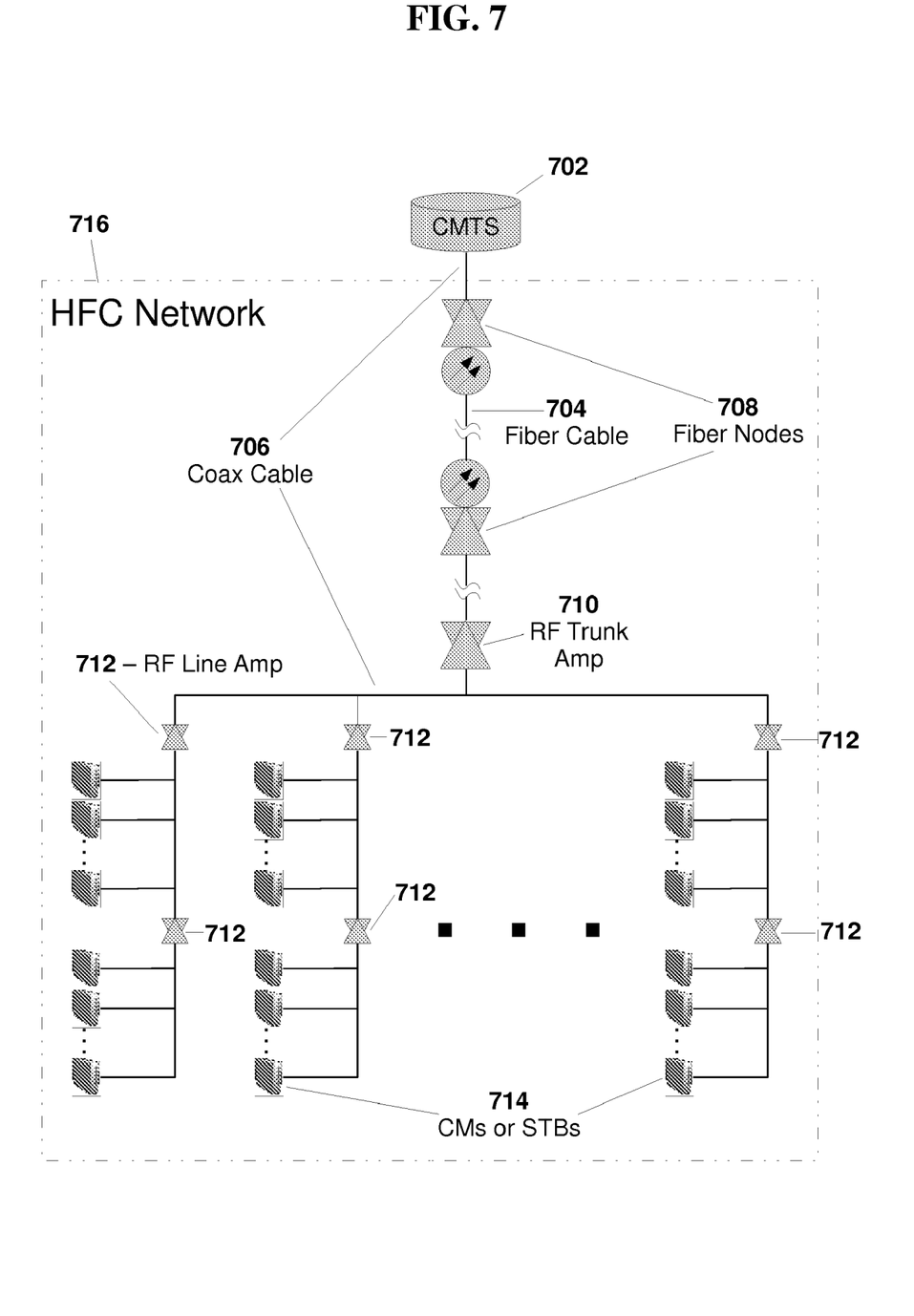
FIG. 7 is a diagram of a sample HFC network (plant) in which the present invention could be implemented.

FIG. 7 is a diagram showing a sample hybrid coax-fiber (HFC) network in which the present invention could be implemented. Specifically, the present invention could be implemented as a burst noise detection module installed in a CMTS receiver in communication with an HFC network, such as a CMTS 702. The CMTS 702 is in communication with an HFC network 716 which could include a fiber optic cable 704, a plurality of coaxial cables 706, a plurality of fiber nodes 708 which convert fiber optic signals to radio frequency (RF) signals (and vice versa), an RF trunk amplifier 710, a plurality of RF line amplifiers 712, and a plurality of CMs and/or set-top boxes (STBs) 714, which could be located in residences/businesses in communication with the network 716. The CMTS 702 sends data traffic and control traffic over the HFC network 716 to the CMs and/or STBs 714. The HFC network 716 allows for bi-directional communication between the CMTS 702 and the CMs/STBs 714, and attaches to the HFC network 716 via coaxial cable 706. The signals being sent over the coaxial cables 706 are then translated to fiber optic signals and then back to coaxial cable by the fiber nodes 708, in order to allow for greater distances between the CMTS 702 and the CMs/STBs 714.

Figure 8:
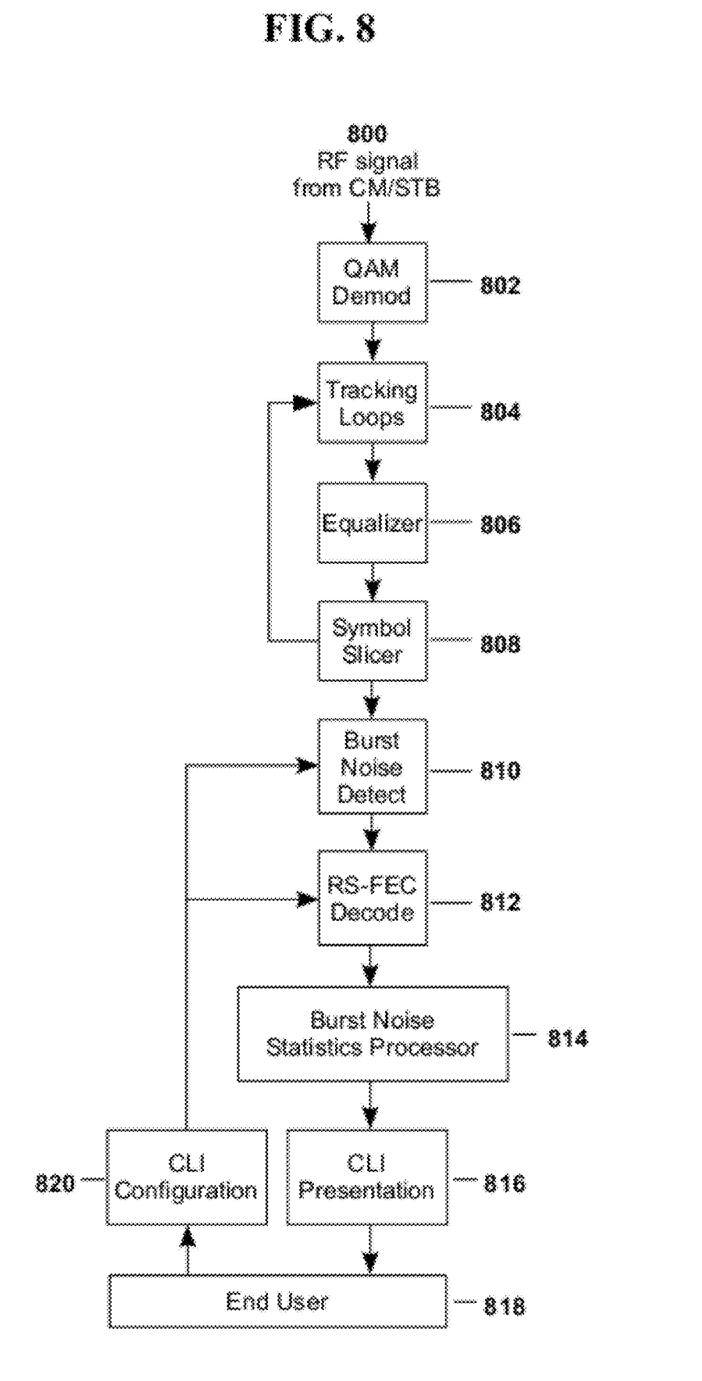
FIG. 8 is a block diagram showing various processing blocks according to the present invention involved in the detection of burst noise.

Referring to FIG. 8, the burst noise detection module 810 performs the steps discussed hereinabove for detecting burst noise in QAM communications occurring over the HFC network 716. The module 810 could be embodied as a field-programmable gate array (FPGA) chip that is programmed in accordance with the present invention and installed in the electronics of the CMTS 702, thereby allowing an operator of the HFC network 716 to monitor for burst noise occurring on the network at a central location. Moreover, the module 810 could be embodied as an Application-Specific Integrated Circuit (ASIC) chip. Further, the module 810 could comprise software instructions stored on a computer-readable medium that is installed in and/or in communication with the CMTS 702, such that the CMTS 702 can read and execute such instructions in order to provide the burst monitoring functionality described herein. In such circumstances, the software instructions stored on the computer-readable medium could be executed by a microprocessor, a microcontroller, and/or a Digital Signal Processor (DSP) within the CMTS 702. Such a computer-readable medium could include, but is not limited to, non-volatile memory such as read-only memory (ROM), electrically-erasable ROM (EEPROM), flash memory, disk memory, etc. It is also noted that the processing steps disclosed herein could be handled by separate hardware and/or software components. For example, one component could handle QAM demodulation and detection of burst noise events, and a second component could handle gathering together the statistics for all of the burst noise events into meaningful data, such as the average amplitude of burst noise events, the maximum amplitude of burst noise events, the frequency of occurrence of burst noise events, and other data such as a histogram showing the breakdown of the durations of various burst noise events. Such a statistics gathering process can be performed in either hardware or software. Still further, it is noted that the present invention need not be implemented in (or associated with) a CMTS, but could also be implemented in connection with any type of device in communication with an HFC network, at any desired location in the HFC network. Thus, for example, the present invention could be implemented in a portable diagnostic device that could be utilized by cable operators/technicians and easily transported to desired locations and connected to an HFC network (i.e., in communication with a cable system) for troubleshooting purposes. In such circumstances, the steps disclosed herein for burst noise detection would be carried out by the portable device. The present invention could also be implemented in a device which is a permanent part of the HFC network in order to provide for constant monitoring of burst noise events at a desired location in the HFC network.

The module 810 could provide a command-line interface (CLI) presentation layer 816 that can be accessed by an end user 818 of the CMTS 702 (e.g., by a technician responsible for maintaining/monitoring the HFC network 716) in order to obtain real-time information relating to burst noise events. Also, such information could be accessed via a graphical user interface (GUI). Moreover, the CMTS 702 could be accessed remotely (e.g., via a TCP/IP network, such as the Internet) by a technician, in order to obtain burst noise information at a location remote from the CMTS 702. Such information could be carried, for example, in an SNMP based MIB block.

Detection by the present invention of the burst noise at the time a symbol is decoded has some key advantages. Since the incoming signal has already been mixed down, any burst noise detected by the symbol detector will be in-band. This is advantageous to operators of the HFC network 716, who are interested in how the burst noise impacts a given channel.

It is noted that the burst noise information detected by the present invention could be used to guide configuration of the CMTS 702 and/or the HFC network 706, so as to reduce the likelihood of errors caused by future burst noise events. FIG. 8. shows one potential embodiment of the processing blocks involved in the detection of burst noise and subsequent reconfiguration of the CMTS and CM. The RF signal from the HFC plant, indicated at 800, arrives at a QAM demodulator 802 of the CMTS, and is later processed by a symbol slicer 808, to obtain normalized amplitude information for the I and Q components of the signal. The burst noise amplitude and duration information is forwarded through the R-S FEC Decoder 812, and onto the burst noise statistics processor 814, which gathers burst noise statistics over a relatively large interval, and presents pertinent information, such as the average duration and amplitude of burst noise events, to the end user 818, through the CLI presentation layer 816, of the CMTS. With this information, the end user 818 can, for example, use a CLI configuration interface 820 to configure the Reed Solomon Forward Error Correction (R-S FEC) module 812 to correct for a measured average burst noise duration. In addition, since the symbol slicer can correlate burst noise errors to specific bits of data, this information can be fed forward to the R-S FEC module 812 to both improve the effectiveness of the R-S FEC module 812 through usage of erasures, and to correlate correctable and uncorrectable errors with burst noise events.

R-S FEC works by dividing the data up into codewords. Each codeword contains a fixed number of data bytes (with the exception of the final codeword of a data burst), and a fixed number of parity bytes. The number of parity bytes determines the maximum number of data bytes that can be corrected in the codeword. For example, if 8 parity bytes are used, then up to 16 errored data bytes can be corrected. A common method employed for improving the effectiveness of the R-S FEC is known as "erasures." Erasures work by zeroing out data bytes which are suspected to be corrupted. When this is done, twice as many corrupted data bytes can be corrected. If the R-S FEC codeword uses 8 parity bytes, and all corrupted data bytes are zeroed out, then up to 32 corrupted data bytes can be corrected (versus 16 without using erasures). In the case of burst noise detection, when a burst noise event is detected, all data bytes received during the burst noise event are assumed to be corrupted and are therefore zeroed out. While not all bytes received during the burst noise will necessarily be corrupted, as long as more than 50% are corrupted, then performing the erasures will improve the effectiveness of the R-S coding. In one embodiment, the decision to perform erasures could be based upon the amplitude of the burst noise since higher amplitude burst noise has a higher probability of corrupting more bytes.

The R-S FEC module 812 can be used for protecting against both AWGN and burst noise. Most errors are typically corrected, but some are not. Tracking of both correctable and uncorrectable errors is a common and very useful practice for determining the health of the HFC network 716. Detection of burst noise in the symbol slicer 804 allows for correlation of burst noise events to correctable and uncorrectable errors by the burst noise statistics processor 810. By performing this correlation, the operator can determine the percentage of all errors caused by burst noise as opposed to AWGN. This is an extremely useful metric for determining the proper course of corrective action.

Burst noise can impact the operation of the CMTS 702 in other ways. One of the functions of the CMTS 702 is to calculate pre-equalization coefficients to be used by the CMs/STBs 714. Pre-equalization coefficients are calculated during DOCSIS periodic ranging requests. If burst noise occurs during this operation, the pre-equalization coefficients can be corrupted. While pre-equalization coefficients are continually being re-calculated, it is very common for the coefficients to be corrupted so badly that the coefficients cannot re-converge to a proper solution. The symbol slicer based burst noise detection can help prevent this from happening by flagging the occurrence of burst noise during the periodic ranging requests. The CMTS 702 can then discard these coefficients and wait for the next opportunity.

Another function of the CMTS 702 is to track both the RF carrier frequency and the underlying symbol rate during each data burst. This is done by feeding back error information from the symbol slicer 808 to tracking loops 804 of the CMTS 702. However, if the error information is dominated by burst noise, it can cause the tracking loops 804 of the CMTS 702 to malfunction. Therefore, when burst noise is detected, the error information obtained during the burst noise events can be ignored by the tracking loops 804, thereby making tracking more robust in the presence of burst noise.

By detecting burst noise during data transfers, the CMTS 702 can correlate the burst noise to the device which is transmitting at that time. The device is commonly tracked by its assigned Service Identifier (SID). By flagging received data packets containing burst noise, the CMTS 702 can associate burst noise with SIDs. This can help the cable operator isolate the source of the burst noise.

Figure 9:
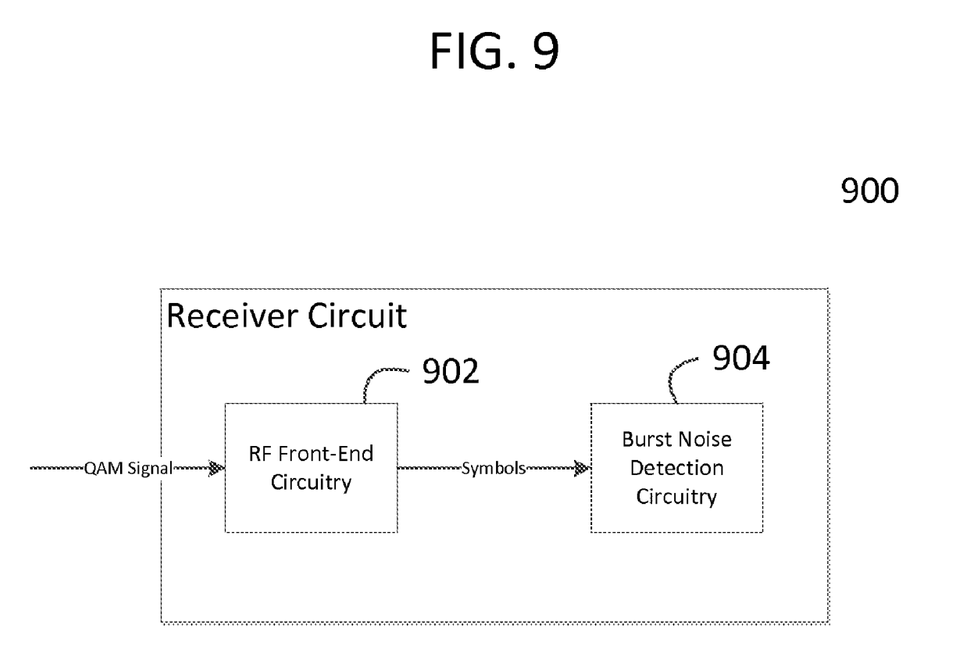
FIG. 9 is a block diagram showing a receiver circuit according to the present invention for detecting burst noise in QAM communications.

FIG. 9 is a block diagram showing a receiver circuit 900 according to the present invention, for detecting burst noise in QAM communications. The circuit 900 includes hardware components which perform the signal processing and burst noise detection functions discussed hereinabove. The circuit 900 includes radio frequency (RF) front-end circuitry 902 for acquiring a QAM signal (e.g., from an HFC network) and extracting symbols from the QAM signal, as well as burst noise detection circuitry 904 for detecting burst noise in the symbols extracted by the RF front-end circuitry 902. As discussed above, the detection circuitry 904 could be embodied as an FPGA or ASIC, as well as associated discrete and/or integrated circuitry needed to support the FPGA and/or ASIC and to interface the FPGA/ASIC to the RF front-end circuitry 902. Importantly, the receiver circuit 900 could be installed in a CMTS receiver that forms part of an HFC network, in a diagnostic device that is connected to the HFC network (e.g., either permanently or temporarily), or in a portable device that can be easily carried by technicians servicing an HFC network.

In summary, detection of burst noise during QAM demodulation allows cable operators to gather many valuable statistics, and can also be used to enhance the performance of the HFC plant. Statistics that can be gathered include, but are not limited to: the portion of the spectrum where the burst noise occurred; the duration of burst events; the amplitude of burst events; the frequency of occurrence of burst events; and the number of correctable and uncorrectable errors which correspond to burst events. Performance enhancements come from the ability to detect symbols corrupted by burst noise and to subsequently prevent measurements associated with the corrupted signals from corrupting other parts of the system. These enhancements include, but are not limited to: improved R-S FEC correction through the usage of erasures; improved pre-equalization performance by discarding corrupted coefficients; and improved tracking loop performance.

Having thus described the invention in detail, it is to be understood that the foregoing description is not intended to limit the spirit or scope thereof. What is desired to be protected is set forth in the following claims.

What is claimed is:

1. A system for detecting burst noise during quadrature amplitude modulation (QAM) communications in a cable modem system, comprising:
a cable modem termination system (CMTS) receiver in communication with a plurality of cable modems, the receiver receiving a QAM signal and demodulating the QAM signal to identify a plurality of symbols; and
a burst noise detection module in communication with the CMTS receiver for detecting burst noise in QAM signals received by the receiver, the burst noise detection module determining normalized amplitudes for each of the plurality of symbols, comparing the amplitudes to a threshold, and recording information relating to a burst noise event for each absolute amplitude that is greater than the predetermined threshold,
wherein the detection module defines boundaries of a QAM constellation using symbols which lie on the perimeter of the constellation, and the detection module detects energy which lies outside of the boundaries of the QAM constellation.

2. The system of claim 1, wherein the detection module determines a magnitude of the burst noise by measuring a difference between a received constellation point and a perimeter constellation point closest to the received constellation point.

3. The system of claim 1, wherein the detection module detects a duration of the burst noise event by detecting a plurality of points which lie outside of the QAM constellation.

4. The system of claim 1, wherein the detection module determines a frequency of occurrence of burst events and correlates burst events with received data.

5. The system of claim 1, wherein the detection module dynamically determines the threshold based upon measured Additive White Gaussian Noise (AWGN) levels.

6. The system of claim 1, wherein the detection module detects burst noise information for each channel in the network, the burst noise information having a resolution corresponding to the width of the channel.

7. The system of claim 1, wherein the detection module transmits information about the burst noise event to an error correction module, the error correction module reducing the effect of future burst noise in the network using the information about the burst noise event.

8. The system of claim 7 wherein the error correction module comprise a Reed-Solomon Forward Error Correction module, the Reed-Solomon Forward Error Correction module using erasures of bytes marked by burst noise detection in order to improve error correction.

9. The system of claim 1, wherein the receiver invalidates a calculated set of equalizer coefficients using information about the burst noise event to avoid usage of corrupted equalizer coefficients in the system.

10. The system of claim 1, wherein performance of tracking loops of the receiver is improved by ignoring feedback information during detected burst noise events.

11. A method for detecting burst noise during quadrature amplitude modulation (QAM) communications in a cable modem system, comprising the steps of:
acquiring a QAM signal at a device in communication with a cable modem system;
demodulating the QAM signal at the receiver to identify a plurality of symbols;
determining normalized amplitudes for each of the plurality of symbols using a burst noise detection module;
defining boundaries of a QAM constellation using symbols which lie on the perimeter of the constellation;
comparing the amplitudes to a threshold using the burst noise detection module by detecting energy which lies outside of the boundaries of the QAM constellation; and
for each absolute amplitude that is greater than the threshold, recording information relating to a burst noise event.

12. The method of claim 11, wherein the step of acquiring the QAM signal further comprises acquiring the QAM signal at a cable modem termination system (CMTS) in communication with a plurality of cable modems.

13. The method of claim 11, further comprising determining a magnitude of the burst noise by measuring a difference between a received constellation point and a perimeter constellation point closest to the received constellation point.

14. The method of claim 11, further comprising determining a duration of the burst noise event by detecting a plurality of points which lie outside of the QAM constellation.

15. The method of claim 11, further comprising determining a frequency of occurrence of burst events.

16. The method of claim 11, further comprising dynamically determining the threshold based upon measured Additive White Gaussian Noise (AWGN) levels.

17. The method of claim 16, further comprising reducing the effect of future burst noise in the network using the error correction module and the information about the burst noise event.

18. The method of claim 17, further comprising using erasures to mark bytes which are suspected to be corrupt in order to improve error correction.

19. The method of claim 16, further comprising transmitting the information about the burst noise event to a Reed-Solomon Forward Error Correction module.

20. The method of claim 11, further comprising transmitting information about the burst noise event to an error correction module.

21. The method of claim 11, further comprising invalidating a calculated set of equalizer coefficients using information about the burst noise event to avoid usage of corrupted equalizer coefficients in the system.

22. The method of claim 11, further comprising enhancing performance of tracking loops of the receiver by ignoring feedback information during detected burst noise events.

23. A non-transitory, computer-readable medium having computer readable instructions stored thereon which, when executed by a cable modem termination system (CMTS) receiver in communication with a plurality of cable modems, cause the receiver to perform the steps comprising:
acquiring a QAM signal at the CMTS receiver;
demodulating the QAM signal at the receiver to identify a plurality of symbols;
determining normalized amplitudes for each of the plurality of symbols using a burst noise detection module;
defining boundaries of a QAM constellation using symbols which lie on the perimeter of the constellation;
comparing the amplitudes to a threshold using the burst noise detection module by detecting energy which lies outside of the boundaries of the QAM constellation; and
for each absolute amplitude that is greater than the predetermined threshold, recording information relating to a burst noise event.

24. The computer-readable medium of claim 23, further comprising computer-readable instructions for causing the receiver to perform the step of determining the magnitude of the burst noise by measuring a difference between a received constellation point and a perimeter constellation point closest to the received constellation point.

25. A receiver circuit for detecting burst noise during quadrature amplitude modulation (QAM) communications in a cable modem system, comprising:
- radio frequency (RF) front-end circuitry for receiving a QAM signal and demodulating the QAM signal to identify a plurality of symbols; and
- burst noise detection circuitry in communication with the RF front-end circuitry, the burst noise detection circuitry determining normalized amplitudes for each of the plurality of symbols, comparing the amplitudes to a threshold, and recording information relating to a burst noise event for each absolute amplitude that is greater than the predetermined threshold,
- wherein the detection module defines boundaries of a QAM constellation using symbols which lie on the perimeter of the constellation, and the detection module detects energy which lies outside of the boundaries of the QAM constellation.

26. The receiver circuit of claim 25, wherein the receiver circuit is installed in a cable modem termination system (CMTS) receiver.

27. The receiver circuit of claim 25, wherein the receiver circuit is installed in a device connected to a hybrid fiber-coaxial (HFC) network.

* * * * *